United States Patent
Lucka et al.

(10) Patent No.: US 8,557,460 B2
(45) Date of Patent: Oct. 15, 2013

(54) HYDROGEN SYSTEM AND METHOD FOR STARTING UP A HYDROGEN SYSTEM

(75) Inventors: Klaús Lucka, Aachen (DE); Stephan Köhne, Würselen (DE); Roland Wruck, Aachen (DE); Sergej Bauer, Aachen (DE); Andreas Klausmann, Herzogenrath (DE); Roland Wollenweber, Aachen (DE)

(73) Assignee: Cool Flame Technologies AS, Porsgrunn (NO)

( * ) Notice: Subject to any disclaimer, the term of this patent is extended or adjusted under 35 U.S.C. 154(b) by 580 days.

(21) Appl. No.: 12/595,337

(22) PCT Filed: Apr. 14, 2008

(86) PCT No.: PCT/NO2008/000133
§ 371 (c)(1),
(2), (4) Date: Sep. 13, 2010

(87) PCT Pub. No.: WO2008/127122
PCT Pub. Date: Oct. 23, 2008

(65) Prior Publication Data
US 2010/0330446 A1    Dec. 30, 2010

Related U.S. Application Data

(60) Provisional application No. 60/911,529, filed on Apr. 13, 2007.

(51) Int. Cl.
*H01M 8/04* (2006.01)
*H01M 8/06* (2006.01)
*H01M 8/10* (2006.01)
*B01J 7/00* (2006.01)

(52) U.S. Cl.
USPC ........... 429/429; 429/428; 429/435; 429/483; 429/505; 422/199

(58) Field of Classification Search
USPC ........ 429/410, 425, 427, 423, 532, 429, 483, 429/435, 505; 422/199; 431/156, 262
See application file for complete search history.

(56) References Cited

U.S. PATENT DOCUMENTS

| | | | |
|---|---|---|---|
| 6,316,134 B1 * | 11/2001 | Cownden et al. | 429/410 |
| 6,793,693 B1 | 9/2004 | Koehne et al. | |
| 2002/0004157 A1 * | 1/2002 | Keefer et al. | 429/34 |
| 2002/0031458 A1 * | 3/2002 | Hirata | 422/189 |
| 2003/0039871 A1 | 2/2003 | Christen et al. | |
| 2004/0197617 A1 | 10/2004 | Kaupert et al. | |
| 2005/0095544 A1 | 5/2005 | Kaupert et al. | |
| 2005/0136305 A1 | 6/2005 | Eberspach et al. | |
| 2006/0147859 A1 | 7/2006 | Hoenig et al. | |

FOREIGN PATENT DOCUMENTS

| | | | |
|---|---|---|---|
| DE | 10246231 A1 * | 4/2004 | |
| EP | 1 767 264 | 3/2007 | |
| WO | 03/021696 | 3/2003 | |

OTHER PUBLICATIONS

International Search Report issued Dec. 9, 2008 in International (PCT) Application No. PCT/NO2008/000133.
Patent Cooperation Treaty (PCT) International Preliminary Report on Patentability issued Jul. 17, 2009 in International Application No. PCT/NO2008/000133.

* cited by examiner

*Primary Examiner* — Kenneth Douyette
(74) *Attorney, Agent, or Firm* — Wenderoth, Lind & Ponack, L.L.P.

(57) ABSTRACT

A hydrogen system (10) comprising a reformer (12), in which a vaporized hydrocarbon fuel (50) is reformed to yield a reformate gas (62) comprising hydrogen, and a hydrogen consumer (40), the reformer and the hydrogen consumer being arranged in fluid communication such that the reformate gas can be fed to the hydrogen consumer, the hydrogen consumer, when in use, consuming at least a part of the hydrogen produced by the reformer wherein the hydrogen system further comprises:—an off gas burner (35) which is arranged such that it is in fluid communication with the hydrogen consumer and a first heat exchanger (21), in which offgas burner, when in use, remaining reformate gas in offgas from the hydrogen consumer is combusted, producing exhaust gas (53) which is passed through the first heat exchanger;—at least one air pump (30) which is arranged such that it is in fluid communication with the reformer and the offgas burner, the at least one air pump, when in use, supplying air to said reformer and offgas burner,—and—a water pump (31) which is arranged such that it is in fluid communication with the first heat exchanger and, thereafter, the reformer, the water pump, when in use, feeding water to the first heat exchanger wherein the heat energy contained in the exhaust gas from the offgas burner is used to produce steam, the steam being fed to the reformer.

29 Claims, 4 Drawing Sheets

HYDROGEN SYSTEM AND METHOD FOR STARTING UP A HYDROGEN SYSTEM

This application claims the benefit of U.S. Provisional Application No. 60/911,529, filed Apr. 13, 2007.

BACKGROUND OF INVENTION (1) Field of Invention

The present invention relates to a hydrogen system comprising a hydrogen generator and a hydrogen consumer and a method for starting up such a hydrogen system.

More specifically, the invention relates to a device and a method for generation of electric energy with or without utilization of produced heat energy. The invention is based on a combination of generation of electric energy and/or heat wherein the hydrogen consumer may comprise a high temperature PEM-fuel cell to operate with process gas from an autothermal reformer using fuel in the form of liquid hydrocarbon fuel oils, diesel, bio-fuels or other suitable liquid fuels. The invention may be utilised as an APU system and/or combined heat and power production. By the term PEM fuel cell we mean proton exchange membrane fuel cells, which uses hydrogen fuel and oxygen, preferably from air, to produce electricity. Rather than comprising a fuel cell, the hydrogen consumer may also comprise other forms of equipment like equipment for production of ammonium or other processes requiring hydrogen and/or carbon monoxide and/or carbon dioxide.

(2) Description of Related Art

When a hydrogen generating system is used with a fuel cell, the HT-PEM fuel cell has some advantages over standard PEM fuel cells. The combination of a reformer reforming a liquid fuel to a syngas/reformer gas and a high-temperature PEM fuel cell is advantageous over fuel cells known from prior art working at lower temperatures in that the membranes in high-temperature PEM cells is considerably more resistant to carbon monoxide (CO) than the membranes in PEM fuel cells. This is very beneficial compared to low temperature PEM cells which in practice has no tolerance for CO, and for which strict measures for removing this gas component needs to be introduced. This can, in addition to the water shift reactor, be initial oxidation (also called SelOx, Selective Oxidation) for removing/oxidizing the CO in the reformate feed to prevent the PEM fuel cell from becoming poisoned with CO. These measures are difficult to control, and thus lead to higher costs (for example there is a need of two more catalysts).

One of the disadvantages of known HT-PEM fuel cell systems is that since they have a higher operating temperature, thus it takes longer to warm up the fuel cell system to its operating temperature when it is cold-started. Known HT-PEM fuel cell systems from the prior art takes 45 minutes and more to warm up which can be a serious disadvantage for many applications where a shorter start-up time is required.

BRIEF SUMMARY OF THE INVENTION

The present invention is therefore concerned with a method for reducing the time required for starting up hydrogen systems in general and more particularly hydrogen systems where the hydrogen consumer comprises a fuel cell, and in particular an HT-PEM fuel cell, and hydrogen systems which are adapted to achieve a more efficient start-up procedure.

A reformer for a fuel cell of the type is known from US 2005/0095544 A1. This publication discloses a method for starting up the reformer. The reformer is, however, only a part of a HT-PEM fuel cell system that needs to be warmed up during the start-up procedure and this publication does not disclose how to speed up the warming up of the rest of the system.

The objective of the present invention is therefore to provide an efficient start-up procedure for the entire hydrogen system and a hydrogen system which is arranged such that a quicker start-up procedure (i.e. the time taken to reach the hydrogen system's operating temperature) may be carried out.

This is achieved according to the present invention as defined herein.

In the following we have used the term reformate gas to denote a gas mixture comprising mainly hydrogen, but also certain amounts of $CO$, $CO_2$, $N_2$ and $H_2O$. It should be understood that the origin of the reformate gas is the reforming process in the reformer, but the exact composition of the reformate gas may vary as the reformate gas is passed through the hydrogen system when the hydrogen system is operating. Also, when there is mention of hydrogen throughout this application, a certain amount of CO will also be present in most cases, even though that may not be mentioned explicitly.

There is provided a hydrogen system comprising a reformer, in which a vaporized hydrocarbon fuel is reformed to yield a reformate gas comprising hydrogen, and a hydrogen consumer, the reformer and the hydrogen consumer being arranged in fluid communication such that the reformate gas can be fed to the hydrogen consumer, the hydrogen consumer, when in use, consuming at least a part of the hydrogen produced by the reformer, the hydrogen system further comprising an offgas burner which is arranged such that it is in fluid communication with the hydrogen consumer and a first heat exchanger, in which offgas burner, when in use, remaining reformate gas in offgas from the hydrogen consumer is combusted, producing exhaust gas which is passed through the first heat exchanger;

at least one air pump which is arranged such that it is in fluid communication with the reformer and the offgas burner, the at least one air pump, when in use, supplying air to said reformer and offgas burner;

a water pump which is arranged such that it is in fluid communication with the first heat exchanger and, thereafter, the reformer, the water pump, when in use, feeding water to the first heat exchanger wherein the heat energy contained in the exhaust gas from the offgas burner is used to produce steam, the steam being fed to the reformer.

The hydrogen consumer may be provided with a bypass fluid line such that the reformate gas can bypass the hydrogen consumer. This is useful, and necessary, if parts of the hydrogen consumer is poisoned by the reformate gas. That may be true if the hydrogen consumer comprises a fuel cell where the membrane is intolerant to carbon monoxide, CO. In the start up phase it may therefore be necessary to bypass the reformate gas until the temperature of the fuel cell has reached a temperature at which the membrane is tolerant to the CO. During start-up it is in any case of interest to bypass at least some of the reformate gas and feed it to the offgas burner which can produce heat so that the rest of the system may warmed up too.

For the heating of the hydrogen consumer, the bypass fluid line may be provided with a heat exchanger and the hydrogen consumer with a heating-cooling circuit, where the heating-cooling circuit preferably is arranged such that it is in fluid communication with the heat exchanger, whereby, when in use, fluid flowing in the heating-cooling circuit and the reformate gas flowing in the bypass fluid line can exchange heat energy. The heating-cooling circuit may be used to heat the hydrogen consumer during the start-up phase and to cool the hydrogen consumer after the operating temperature of the system has been reached and it is working in a steady modus.

The hydrogen system may further comprise a third heat exchanger arranged such that, when the system is in use, heat energy from the offgas burner can be used to heat the air flow from the air pump to the reformer, i.e. the air which is fed to the reformer can be preheated by using heat energy produced in the offgas burner.

In an embodiment of the invention, the hydrogen system further comprises a second heat exchanger through which, when in use, the reformate gas from the reformer and the steam from the first heat exchanger and/or air from the air pump flows such that the heat energy contained in the reformate gas flow can be used to heat up the steam and/or air flow, thereby reducing the temperature of the reformate gas. The steam, which produced in the first heat exchanger, and the air is preferably mixed before being passed through the second heat exchanger, but it is possible to feed the steam and the air through separate fluid lines through the second heat exchanger and further to the reformer.

In another embodiment, the hydrogen system further comprises a water shift reactor through which, when in use, the reformate gas flows, whereby carbon monoxide produced in the reformer is used to produce hydrogen and carbon dioxide. Such a water shift reactor may be necessary if the hydrogen consumer comprises a fuel cell with a membrane which is sensitive to high CO-content in the reformate gas.

The reformer itself is preferably provided with a mixing space where mixing of vaporized hydrocarbon fuel air and/or steam takes place and a reforming space where the reforming process takes place. The mixing space comprises a vaporizer for the vaporization of a liquid hydrocarbon fuel, a combined inlet or separate inlets for supply of air and steam, and a glow plug for the ignition of the mixture of hydrocarbon vapour and air during the warm-up period of the hydrogen system.

Before being fed into the reformer through the vapourizer, the liquid hydrocarbon fuel may, if necessary, undergo desulphurization equipment for desulphurization. Such equipment is commercially available equipment and is not explained any further here.

The reforming process takes place in the reforming space which comprises a catalyst and an outlet for the products from the reformer.

The reformer's reforming space and mixing space may be formed as to separate parts or units provided with fluid communication between them or the reformer may comprise a single compartment wherein the reformer space is located in one end and the mixing space in another end.

In a further embodiment of the invention the second heat exchanger is provided with an inlet for the supply of additional water to the steam. The addition of water to the steam will lead to a further decrease of the temperature of reformate gas passing through the second heat exchanger and also produce more steam for injection into the reformer.

In a further embodiment of the invention the hydrogen consumer comprises a fuel cell with an anode side comprising a fluid inlet and a fluid outlet and a cathode side comprising a fluid inlet and a fluid outlet, the fuel cell using at least some of the produced hydrogen to produce electrical energy.

The hydrogen system further comprises a fluid line connected to the cathode fluid inlet and a fan where the fan provides air to the fluid inlet of the cathode side of the fuel cell. In order to warm the air before it enters the cathode fluid inlet, the gas exiting the fluid outlet of the cathode may be used to heat the air before it is fed to the fluid inlet of the cathode by providing a heat exchanger through which cold air and warm gas from the cathode flows and exchanges heat energy.

In a further embodiment of the invention the hydrogen system comprises a fourth heat exchanger through which the products from the water shift reactor and products from the cathode side of the fuel cell is passed such that the products from the water shift reactor is cooled by the products from the cathode side of the fuel cell before entering the anode side of the fuel cell. After passing through the fourth heat exchanger, which is further connected to the off-gas burner, the products from the cathode side of the fuel cell may be passed on to the off-gas burner.

As an alternative to the above, a further embodiment of the hydrogen system comprises a fourth heat exchanger, as above, but which is further arranged such that it is in fluid communication with the mixture of steam and air flowing to the reformer such that the products from the cathode side of the fuel cell is passed on to the reformer. The products from the cathode side of the fuel cell comprises steam and air, and with this arrangement there will be need for less supply of steam from the first heat exchanger and air.

In a further embodiment of the invention the fuel cell is a HT-PEM fuel cell.

There is also provided an offgas burner comprising a housing with at least one inlet for air and a combustible offgas, and an outlet for exhaust gas from the offgas burner wherein the offgas burner is provided with a glow plug for ignition of the combustible offgas.

In an embodiment of the invention the offgas burner is provided with a catalyst.

The normal belief among skilled persons is that the combustible offgas will be oxidized without any sort of help from triggering means when entering a catalytic offgas burner. The inventors have realized that this not always the case and in order to ensure that the combustible offgas actually is oxidized, the offgas burner is provided with at least one glow plug. The glow plug is preferably located close to the inlet of the offgas burner.

If the offgas burner is provided with a catalyst, the catalyst may be poisoned by CO if the temperature of the catalyst is to low (<150° C.) so that the offgas is not oxidized, which is a problem during the start-up phase before the temperature of the offgas burner is sufficiently high. The provision of a glow plug is therefore particularly useful when the offgas burner is provided with a catalyst. Furthermore, the glow plug will start the oxidization of the CO before the CO enters the catalyst. This will reduce the amount of CO entering the catalyst and also help increase the temperature in the catalyst quickly— both of which contributes to prevent the catalyst from becoming poisoned by CO. The use of a catalytic off-gas burner is also beneficial in that $NO_x$ and CO emissions can be avoided.

There is also provided a method for starting up a hydrogen system comprising where the hydrogen system comprises:

a reformer for the production of hydrogen from a liquid hydrocarbon fuel wherein the reformer is provided with a mixing space and a reforming space, the mixing space comprising a vaporizer for the vaporization of the liquid hydrocarbon fuel, water and air inlet or inlets for the supply of steam and air and a glow plug, the reforming space comprising a catalyst for the reforming process and an outlet for the products from the reformer;

a hydrogen consumer arranged in fluid communication with the reformer;

an offgas burner for burning off reformate gas, the off-gas burner being provided with a glow plug; and at least one air pump supplying air to the offgas burner and the reformer;

a first heat exchanger arranged in fluid communication with the offgas burner such that offgas from the offgas burner can be passed through the first heat exchanger;

a water pump arranged in fluid communication with the first heat exchanger such that water can be passed through the first heat exchanger, there further being provided fluid communication between the first heat exchanger and the reformer for steam produced in the first heat exchanger, where the method comprises the following steps:

turning on the glow plug and thereby heating the hydrocarbon fuel vapourizer;

passing the liquid hydrocarbon fuel through the vaporizer when the hydrocarbon fuel vaporizer has reached a predetermined temperature and mixing the resulting hydrocarbon vapour with air in the mixing space, thereby starting a combustion of the mixture of hydrocarbon vapour and air;

continue the combustion process until the reformer catalyst inlet temperature has reached a predefined value whereafter the combustion process is terminated by turning off the fuel supply and the glow plug;

cooling down the mixing space in which the combustion process has taken place, until a predetermined temperature has been reached where self-ignition of the mixture of hydrocarbon vapour and air will not take place;

turning on the glow plug in the offgas burner and the supply of liquid hydrocarbon fuel to the reformer, whereby the reformer starts producing a reformate gas by catalytic partial oxidation (CPO);

passing the reformate gas to the offgas burner wherein the reformate gas is burned off producing heat which is used to preheat the air being fed to the reformer, the preheating taking place in a third heat exchanger;

turning on the water pump when the temperature of the first heat exchanger reaches a predetermined temperature, preferably at least 100° C., whereby heat energy contained in the exhaust from the offgas burner is used to produce steam;

feeding the reformer with the mixture of steam and air so that a steam reforming process starts, thereafter gradually increasing the amount of steam being fed into the reformer such that the reforming process gradually is converted to auto thermal reforming (ATR).

Auto thermal reforming (ATR) is a combination of steam reforming and partial oxidation.

An embodiment of the method comprises the step of providing the hydrogen consumer with a bypass fluid line for the reformate gas and, if necessary or desirable, passing the reformate gas through the bypass fluid line. As mentioned above, it may be necessary to bypass the reformate gas if the one or more parts of the hydrogen consumer is intolerant to carbon monoxide.

A further embodiment comprises the step of providing the bypass fluid line with a heat exchanger and the hydrogen consumer with a heating-cooling circuit, and, if necessary or desirable, letting the fluid flowing in the heating-cooling circuit and the reformate gas flowing in the bypass fluid line exchange heat energy. In this way the heating-cooling circuit may be used to warm the hydrogen consumer during the start-up phase and to be cooled later during normal operation of the hydrogen system.

Yet a further embodiment of the invention comprises the step of providing a second heat exchanger through which reformate gas and the steam from the first heat exchanger, or a mixture of steam from the first heat exchanger and air, can be passed before being fed to the reformer, thereby decreasing the temperature of the reformate gas and increasing the temperature of the steam or the mixture of steam and air.

Yet a further embodiment of the invention comprises the step of at least partially removing carbon monoxide in the reformate gas by providing a water shift reactor with an inlet and an outlet, the inlet of water shift reactor being arranged in fluid communication with the reformer or, if provided, the second heat exchanger on and the outlet of the water shift reactor being in fluid communication with the hydrogen consumer. The water shift reactor can may be provided when if, for example, the hydrogen consumer comprises a fuel cell which is intolerant to carbon monoxide. When operating temperature is reached, the water shift reactor should then remove a sufficient amount of carbon monoxide so that the membrane of the fuel cell is not poisoned. The proportion of CO in the reformate gas which is tolerated will depend on the type of membrane used in the fuel cell. A typical value for HT-PEM fuel cell membranes which are commercially available today is up to 2% carbon monoxide.

A further embodiment of the invention comprises the step of providing the hydrogen consumer with a fuel cell comprising an anode side and a cathode side.

A further embodiment of the invention comprises the step of providing a fourth heat exchanger in fluid communication with the water shift reactor and the anode side of the fuel cell and letting the reformate gas and steam from the first heat exchanger exchange heat energy before the reformate gas is fed into the anode side of the fuel cell.

In an alternatively embodiment to the one above, the present invention may comprise the step of providing a fourth heat exchanger in fluid communication with the water shift reactor and the anode side of the fuel cell, as above, and letting the reformate gas and products from the cathode side of the fuel cell exchange heat energy in the fourth heat exchanger before the reformate gas is fed into the anode side of the fuel cell. The products from the cathode side of the fuel cell may be fed into the offgas burner after having passed through the fourth heat exchanger.

Thus, the fourth heat exchanger can be used to control the temperature of the reformate gas so that it does not exceed the temperature limits of the fuel cell by letting the reformate gas exchange heat with steam from the first heat exchanger or products from the cathode side of the fuel cell in the fourth heat exchanger.

A further embodiment of the invention comprises the step of providing a separate air pump for the supply of air to the offgas burner. Thus, the air for the combustion process in the offgas burner may be provided from the same air pump that provides air to the reformer or the air for the offgas burner may be provided by using a separate air pump or a fan. In the case that the products from the cathode side of the fuel cell is passed through the fourth heat exchanger and then on to the offgas burner, some air may also be provided through these products simply by feeding the cathode with a surplus air as compared to what is needed in the process taking place in fuel cell.

A further embodiment of the invention comprises the step of supplying extra water to the second heat exchanger, thereby further lowering the temperature of the reformate gas and increasing the amount of steam that can be fed to the reformer.

Depending on the type of fuel which is used, there may be a need of removing sulphur from the liquid hydrocarbon fuel before it is fed though the vaporizer and into the mixing space of the reformer. A further embodiment of the invention therefore comprises the step of providing desulphurizing equipment for desulphurization of the liquid hydrocarbon fuel before passing the liquid hydrocarbon fuel through the vaporizer. As mentioned above, desulphurizing equipment is commercially available and will therefore not be explained any further here.

Thus, the invention relates to a hydrogen system and a method for start-up of the system, where a liquid fuel is reformed in a reformer yielding a syngas, or reformate gas, comprising mainly $H_2$, $H_2O$, $CO$, $CO_2$ and $N_2$. If necessary, particularly if the hydrogen consumer comprises a fuel cell, the reformate gas may be passed from the reformer to a water-shift reactor where water and CO is made to react according to the following reaction $H_2O+CO \leftarrow \rightarrow CO_2+H_2$. If the fuel cell is of the high temperature PEM type of fuel cell, the CO-content in the effluent from the water-shift reactor is preferably reduced to below 2 volume %, and more preferably below 1 volume %, before being passed from the water-shift reactor to a high-temperature PEM fuel cell.

A reformer like the one described in for instance U.S. Pat. No. 6,793,693 B1 to Koehne et al. may be employed in the hydrogen system. This reformer allows complete combustion of liquid fuels, catalytic partial oxidation, and auto-thermal reforming of liquid fuels. By using this type of reformer, the combination as described above and shown schematically in the figures is beneficial in that the hydrogen system, including the hydrogen consumer, which may be a fuel cell, can be heated up quickly as the offgas burner lights off during the start-up phase. During the start-up phase, the reformer performs a catalytic partial oxidation (CPO) which gradually changes to auto thermal reforming (ATR) as the temperature of the hydrogen system gradually increases. Therefore a high temperature level is available from the very beginning (at a cold start). Utilisation of the thermal energy at a high temperature level is realised by integrating separate heat exchangers in the offgas stream of the catalytic offgas burner. The offgas directly flows through the first heat exchanger for steam production. This also assures that the temperature of the first heat exchanger increases quickly which means that the production of steam, which is required for auto-thermal reforming of the liquid fuel in the reformer, also starts quickly after the hydrogen system has been started.

The system features the following unique design characteristics
- The reformer is capable of performing complete combustion of liquid fuels, catalytic partial Oxidation, and auto-thermal reforming of liquid fuels. (All in one reformer)
- The system, including the fuel cell, can be heated up very fast. This feature is realized by starting the system with a complete combustion inside the reformer. By direct preheating of the oxidant air and production of steam with the instantly (directly after the combustion phase) operating off-gas burner the start can be performed quickly using the glow plugs and the fuel evaporator.

Furthermore:
- the third heat exchanger is integrated in the offgas burner and airflow through this heat exchanger preheats the airflow going to the reformer;
- the vaporizer (i.e. the first heat exchanger, not to be confused with the fuel vaporizer) which produces steam, is situated in the outlet stream of offgas burner;
- if a shift stage is included, there is no heat transfer downstream from the shift stage which prevents cool down of the gas stream during the start phase;
- if the offgas burner is provided with a catalyst, the glow plug of the offgas burner with glowplug situated between the offgas burner catalyst and flashback protection. (CO content of reformate inhibits auto-ignition of catalytic combustion catalysts)

BRIEF DESCRIPTION OF THE DRAWINGS

In the following, the present invention will be explained in more detail with reference to the attached figures, where.

DETAILED DESCRIPTION OF THE INVENTION

The reference numbers in the figures below refer to the same technical features in the different figures, unless stated otherwise.

Figure 1:
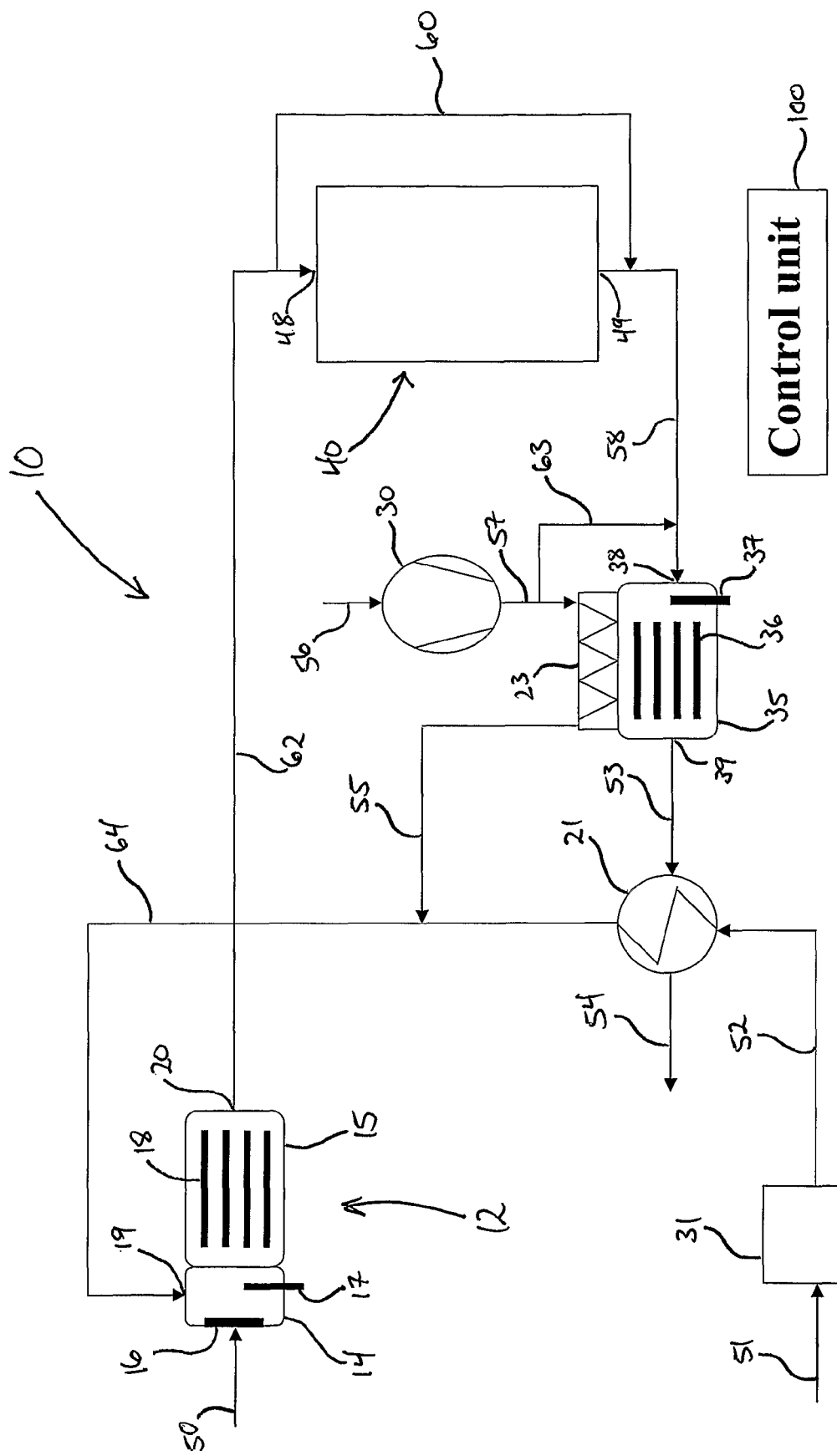
FIG. 1 is a diagram schematically showing a first embodiment of the hydrogen system according to the invention.

FIG. 1 schematically shows the first embodiment of the present invention where the hydrogen system 10 comprises a reformer 12 where reforming process takes place.

The reformer 12 comprises a mixing space 14 and a reformer space 15. The mixing space and the reformer space may be formed as two separate units or compartments, as indicated on FIG. 1, but then there must be arranged for fluids to flow from the mixing space 14 to the reformer space 15. Alternatively, the reformer is formed in a single unit or compartment wherein the mixing space 14 and the reformer space 15 occupy different spaces in the unit.

The mixing space 14 further comprises vaporizer 16 for vaporizing the liquid hydrocarbon fuel which is fed through the fluid line 50 to the vaporizer 16, through the vaporizer, which vaporizes the liquid hydrocarbon fuel as the fuel passes through the vaporizer 16. In the mixing space 14, the vaporized fuel is mixed with air or a mix of air and steam. The vaporized fuel is mixed with air in the initial stages of the start-up process, before the reforming process is started. Later, when the reforming process is starting, the air/steam mixture is fed into the mixing space.

The mixing space 14 also comprises at least one glow plug 17 which is provided there in order to heat up the vaporizer 16 and to ensure that the combustion of the mixture of air and vaporized fuel takes place during the start-up process.

Air and air/steam mixture is fed into the mixing space 14 through the inlet 19. A fluid line 64 is connected to the inlet 19, thus providing air or air/steam mixture to the mixing chamber. Although there is only shown one inlet 19 for air and air/steam mixture, it is obviously possible to provide any number of inlets that is found necessary. It would also be possible to feed air and steam to the mixing space 14 through different inlets.

The reforming space 15 comprises a catalyst 18 which helps the reforming process taking place and an outlet 20 through which combustion products during the initial stages of the start-up process and reformate gas is exited. When the temperature of the catalyst reaches a sufficiently high temperature during the start-up process, the glow plug 17 is turned off.

The outlet 20 is connected to a fluid line 62 which feeds the reformate gas from the reformer 12 to a hydrogen consumer 40 with an inlet 48, to which the fluid line 62 is connected, and an outlet 49, to which a fluid line 58 is connected. The hydrogen consumer may be a fuel cell, equipment for manufacturing of ammonia or another type of apparatus that consumes reformate gas which mainly comprises hydrogen.

There is also provided a bypass fluid line 60 through which at least some of the reformate gas from the reformer 12 may be passed. If the hydrogen consumer 40 comprises a fuel cell, particularly a HT-PEM fuel cell, it may be necessary to bypass the reformate gas through the bypass fluid line 60 to avoid poisoning the fluid cell membrane or membranes with carbon monoxide.

The fluid line 58, which is connected to the hydrogen consumer 40 in one end, is connected to an offgas burner 35 in the other end. The reformate gas passing through the hydrogen consumer 40 or the bypass fluid line 60 is therefore fed to the offgas burner where it is combusted. The heat energy produced in the offgas burner 35 is important in order to achieve a fast start-up process of the hydrogen system 10.

The offgas burner 35 comprises an inlet 38 and an outlet 39 for the exhaust gases and preferably a catalyst 36 so that a catalytic oxidation process can take place in the offgas burner 35. There is also provided at least one glow plug 37 in the offgas burner 35, preferably close to the inlet 38 before the catalyst 36.

There is also provided an air pump 30 with air supplied through fluid line 56. The air pump 30 is used to supply the reformer 12 with air and optionally also the offgas burner 35. The offgas burner may be supplied with air from a separate air pump or fan instead of the air pump 30.

The offgas burner 35 produces heat which is used to heat the air from the air pump 30 in a third heat exchanger 23. The air from air pump 30 is fed to the third heat exchanger 23 through the fluid line 57. The air is warmed in the third heat exchanger and then fed through fluid line 55 which is connected to the third heat exchanger 23.

The exhaust gases from the offgas burner 35 is fed through the fluid line 53 which is connected to the outlet 39 of the offgas burner 35 and a first heat exchanger 21. After passing through the first heat exchanger 21 the exhaust gases is passed through a exhaust fluid line 54.

The hydrogen system is also provided with a water pump 31 which is supplied with water through fluid line 51. The water pump 31 pumps water through fluid line 52 to the first heat exchanger 21, and as the water is passed through the first heat exchanger 21, the water is vaporized by the heat energy contained in the exhaust gases from the offgas burner 35. The steam thus produced is further fed through fluid line 64 to the reformer 12. During the start-up procedure, the supply of water is not turned on immediately. Only when the first heat exchanger reaches a temperature of 100° C. or more is the water pump started so that the production of steam may be started. When the production of steam starts, the reforming process also starts gradually, and the warming up of the hydrogen system speeds up.

As shown on FIG. 1, the fluid line 55, containing the air from the third heat exchanger 23, and the fluid line 64, containing steam from the first heat exchanger 21, may be connected such that the fluid fed into the reformer 12 is a mixture of air and steam. Another option would be to feed the steam and the air in separate fluid lines to the reformer 12.

The entire hydrogen system is controlled by a control unit 100 in a standard way according to rules set by operators of the system, and will not be explained any further here.

Figure 2:
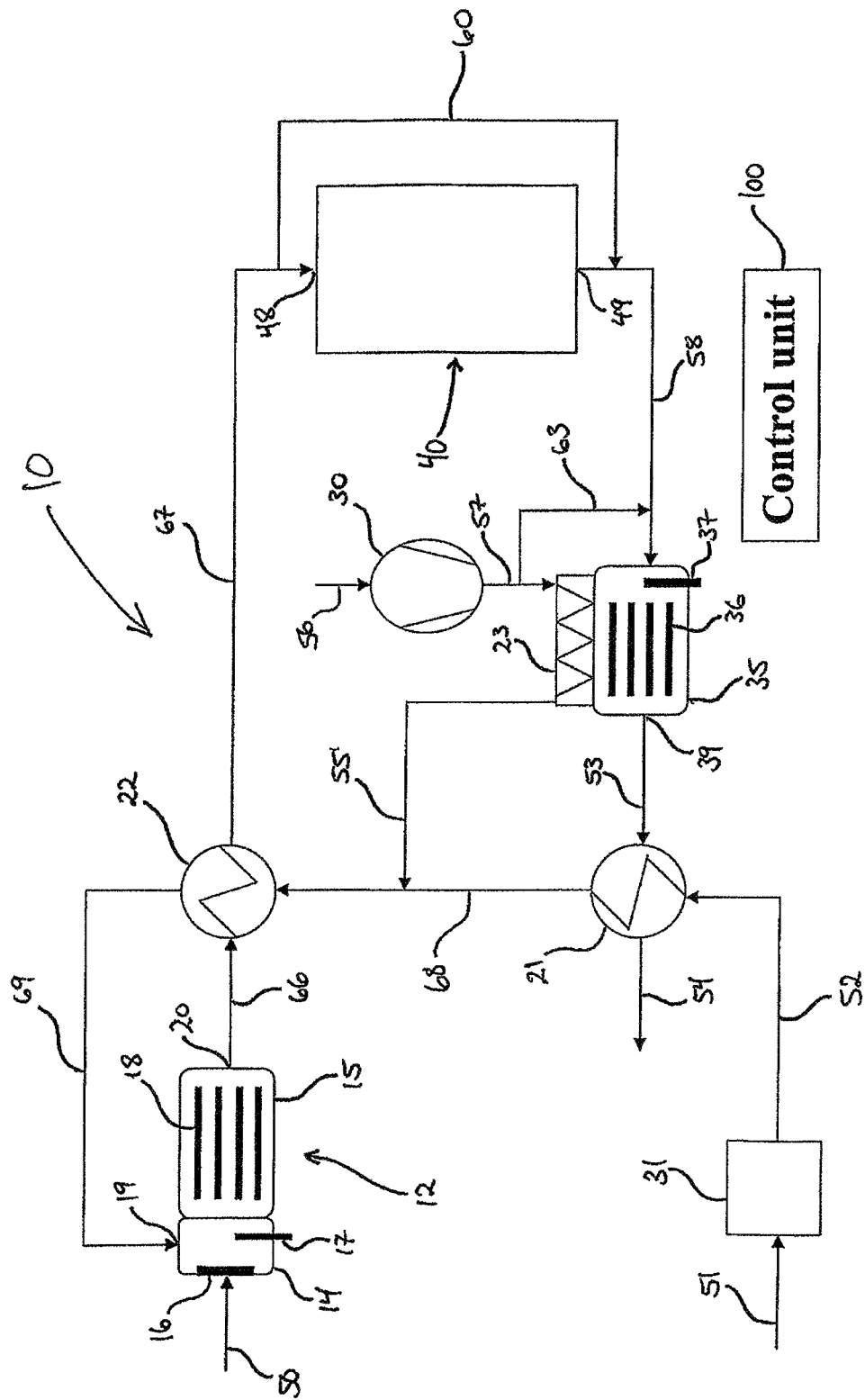
FIG. 2 is a diagram schematically showing a second embodiment of the hydrogen system according to the invention.

In FIG. 2 a second embodiment of the invention is shown. This embodiment is basically the same as the embodiment shown in FIG. 1 and the common features of the two embodiments will not be discussed again.

The difference between the embodiments of the present invention shown in FIGS. 1 and 2 is that the embodiment shown in FIG. 2 is provided with a second heat exchanger 22. The second heat exchanger is connected to the first heat exchanger through the fluid line 68 and further to the reformer 12 through fluid line 69. The steam produced in the first heat exchanger 21 is fed through the fluid line 68, in which it is mixed with air from fluid line 55, further through the second heat exchanger 22 and then to the reformer 12. The second heat exchanger 22 is also connected to the outlet 20 of the reformer through fluid line 66 and to the inlet 48 of the hydrogen consumer 40 through fluid line 67. The reformate gas produced in the reformer 12 is fed through the fluid line 66 to and through, the second heat exchanger 22 and further to the hydrogen consumer 40 through fluid line 67.

As the reformate gas and the mixture of steam and air passes through the second heat exchanger 22, the heat energy contained in the reformate gas is used to heat up the mixture of steam and air. The second heat exchanger 22 can in other words be used to reduce and control the temperature of the reformate gas from the reformer 12. At the same time means the increased temperature of the steam/air mixture that the reformer 12 is more quickly heated.

As with the first embodiment described above, the hydrogen system is controlled by the control unit 100.

Figure 3:
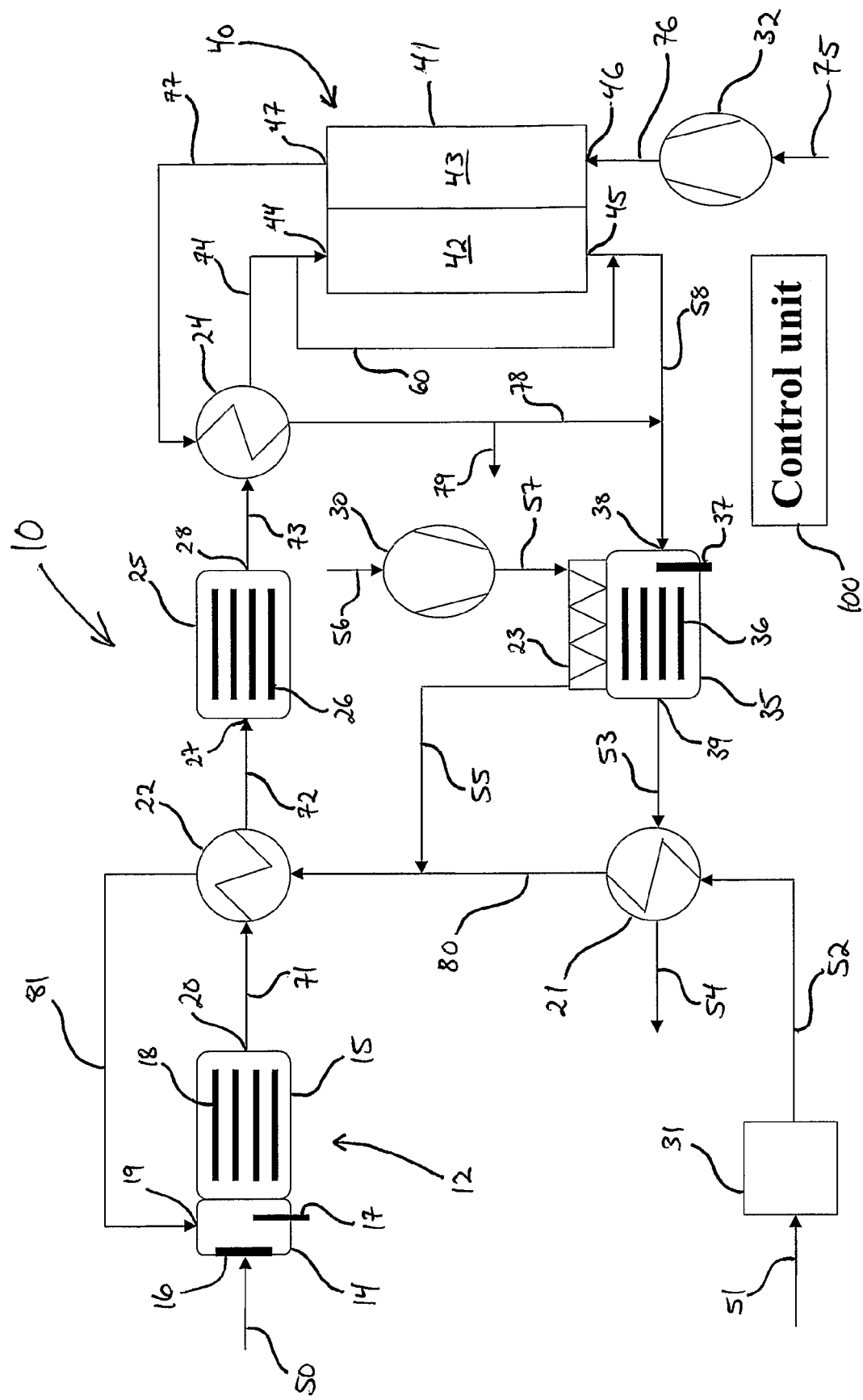
FIG. 3 is a diagram schematically showing a third embodiment of the hydrogen system according to the invention.

A third embodiment of the invention is shown on FIG. 3. This embodiment also has many similarities with the two embodiments of the invention already described. Generally, the features which are common to the three embodiments will not be discussed again.

The third embodiment of the hydrogen system 10, shown on FIG. 3, comprises, in addition to the features of the second embodiment, a water shift reactor 25, a fourth heat exchanger 24 and fan 32 which supplies air to the hydrogen consumer 40 which in this embodiment comprises a fuel cell, preferably a HT-PEM fuel cell 41.

When the hydrogen consumer 40 comprises a HT-PEM fuel cell, it may be necessary to keep the amount of carbon monoxide present in the reformate gas which is fed into the HT-PEM fuel cell below a certain level in order not to poison the membrane of the HT-PEM fuel cell. This is done by providing the water shift reactor 25 which removes enough carbon monoxide present in the reformate gas from the reformer 12 to keep the level below the fuel cell's required maximum level of CO in the reformate gas. The water shift reactor 25 contains a catalyst 26 and is preferably connected to the second heat exchanger through a fluid line 72 and to the fourth heat exchanger 24 or, optionally, directly to the fuel cell.

The water shift reactor 25 does not start working until the catalyst 26 reaches a certain temperature and until that temperature is reached during start-up of the hydrogen system 10, the reformate gas may have to be bypass the fluid cell through the bypass fluid line 60 until the water shift reactor starts to remove CO from the reformate gas. If the membranes of the fuel cell can tolerate the content of CO present in the reformate gas, then the reformate gas may be passed directly through the fuel cell.

The HT-PEM fuel cell comprises an anode side 42, with an inlet 44 and an outlet 45, and a cathode side 43, with an inlet 46 and an outlet 47. Air is fed to the inlet of the cathode side 43 through a fluid line 76 which is connected to a fan 32. The fan 32 receives air through a fluid line 75. Through the process taking place in the fuel cell, the air, which leaves the cathode side 43 through the fluid line 77, contains steam. This steam may be fed to the reformer as explained below.

The fourth heat exchanger 24 is preferably connected to the water shift reactor 25 and to the inlet 44 of the anode side 42 such that the reformate gas can pass through the fourth heat exchanger 24. The fourth heat exchanger is also connected to the outlet 47 of the cathode side 43 of the fuel cell 41 and to a fluid line 78 connected to the offgas burner 35, preferably via fluid line 58 or alternatively directly. The cathode gas, i.e. the gas leaving the cathode side 43 through the fluid line 77, is therefore passed through the fourth heat exchanger 24 where it exchanges heat energy with the reformate gas. The temperature of the reformate gas is lowered to a level which the fuel cell can tolerate before the reformate gas is fed into the anode side 42 of the fuel cell while the temperature of the cathode gas will consequently increase.

It should be mentioned that both the second heat exchanger 22 and the fourth heat exchanger 24 may be provided with an extra inlet for water injection. This can be used to further control the temperature of the reformate gas flowing through the heat exchangers 22, 24 and at the same time producing steam which may be fed to the reformer 12.

The fluid line 78 can be connected to a fluid line 79 which branches off from fluid line 78. The fluid line 79 may be connected to the fluid line 80 such that the cathode gas, which contains steam as a result of the reactions taking place in the fuel cell 41, can be fed, via the fluid line 80, to the reformer 12 together with the steam produced in the first heat exchanger 21. As a result, the first heat exchanger does not need to produce as much steam as it would otherwise have to.

Figure 4:
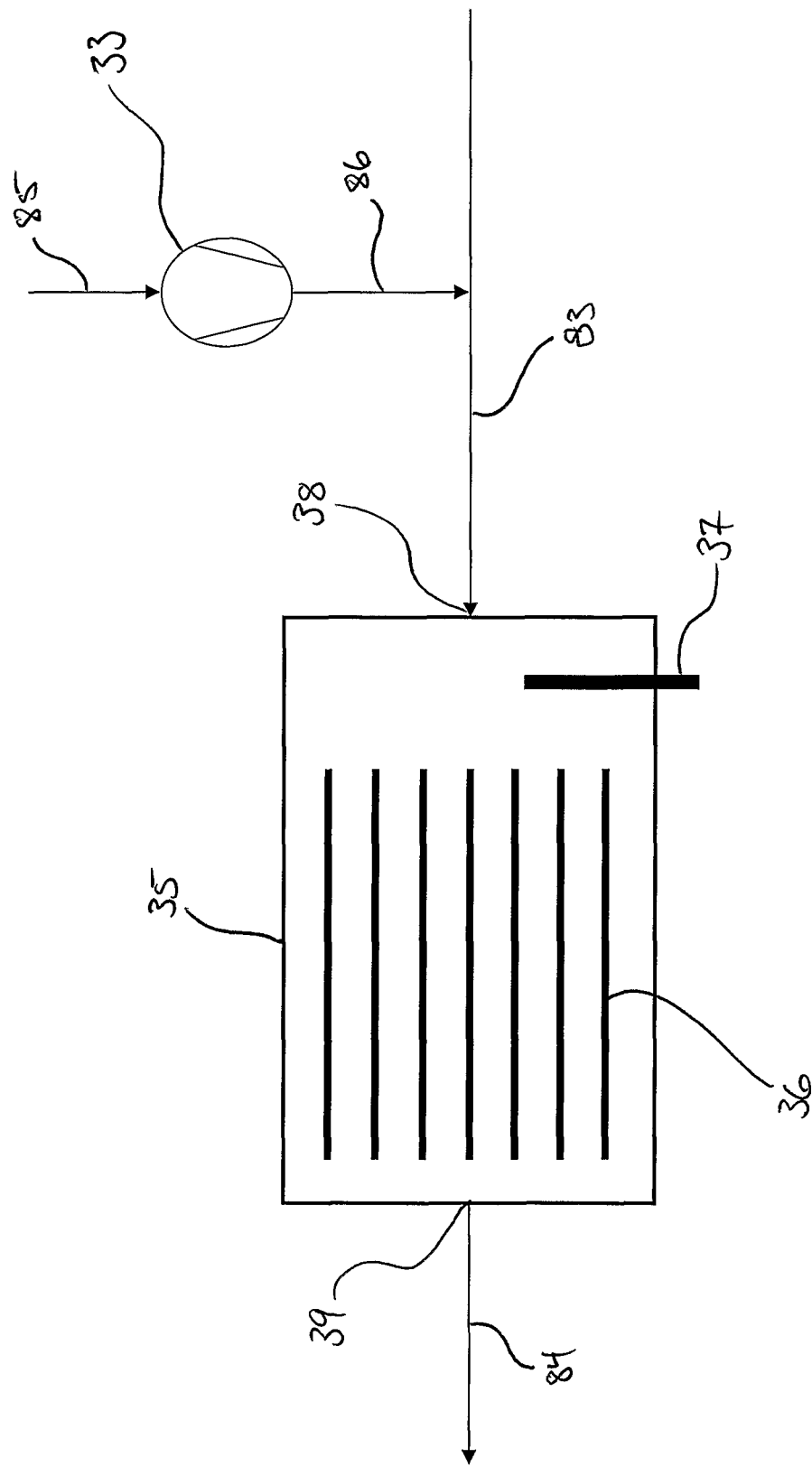
FIG. 4 is a diagram schematically showing an offgas burner according to the invention.

In FIG. 4, an offgas burner 35 is shown schematically. The offgas burner is provided with an inlet 38 and an outlet 39. A fluid line 83 is connected to the inlet 38 and is feeding an offgas to the offgas burner 35. A fluid line 84 is connected to the outlet of the offgas burner 35. The exhaust gases resulting from the combustion taking place in the offgas burner is removed through the fluid line 84.

The offgas burner 37 is further provided with a glow plug 37 which is preferably located near the inlet 38 of the offgas burner. The offgas burner 35 is also preferably provided with a catalyst such that a catalytic combustion takes place in the offgas burner 35.

As mentioned earlier, the reason for providing the offgas burner with a glow plug 37 is to ensure that the combustion of the offgas which is fed to the offgas burner is actually taking place, which is not always the case.

There is also provided a supply of air by using an air pump or a fan 33 which is preferably connected to the offgas burner 35 via a fluid line 86 which is connected to the fluid line 83, thereby mixing the air and the offgas before the mixture is fed into the offgas burner 35. The fan is supplied with air through the fluid line 85.

The invention claimed is:

1. A hydrogen system comprising:
a reformer in which a vaporized hydrocarbon fuel is reformed to yield a reformate gas comprising hydrogen;
a hydrogen consumer arranged in fluid communication with the reformer such that the reformate gas is fed to the hydrogen consumer, the hydrogen consumer consuming at least a part of the hydrogen produced by the reformer;
an offgas burner which is arranged in fluid communication with the hydrogen consumer and receives offgas exhausted from the hydrogen consumer, the offgas burner combusting remaining reformate gas in the offgas exhausted from the hydrogen consumer;
a first heat exchanger which is in fluid communication with the offgas burner and receives exhaust gas from the offgas burner;
an air pump which is arranged in fluid communication with the reformer and the offgas burner, the air pump supplying air to said reformer and offgas burner; and
a water pump which is arranged in fluid communication with the first heat exchanger and, thereafter, the reformer, the water pump feeding water to the first heat exchanger wherein the heat energy contained in the exhaust gas from the offgas burner is used to produce steam,
wherein the steam produced by the first heat exchanger is fed to the reformer,
wherein the reformer includes a mixing space and a reforming space, and the reformer further includes
(i) a vaporizer for the vaporization of a liquid hydrocarbon fuel,
(ii) a combined inlet or separate inlets for supply of air and steam,
(iii) a glow plug for the ignition of the mixture of hydrocarbon vapor and air during a warm-up period of the hydrogen system,
(iv) a catalyst, and
(v) an outlet for the reformate gas.

2. The hydrogen system of claim 1, wherein the hydrogen consumer is provided with a bypass fluid line such that the reformate gas can bypass the hydrogen consumer.

3. The hydrogen system of claim 2, wherein the bypass fluid line is provided with a heat exchanger and the hydrogen consumer is provided with a heating-cooling circuit, the heating-cooling circuit being arranged in fluid communication with the heat exchanger, whereby fluid flowing in the heating-cooling circuit and the reformate gas flowing in the bypass fluid line can exchange heat energy.

4. The hydrogen system of claim 1, further comprising a third heat exchanger arranged such that heat energy from the offgas burner can be used to heat the air flow from the air pump to the reformer.

5. The hydrogen system of claim 1, further comprising a second heat exchanger through which the reformate gas from the reformer and the steam from the first heat exchanger and/or air from the air pump flows such that the heat energy contained in the reformate gas can be used to heat up the steam and/or air flow, thereby reducing the temperature of the reformate gas.

6. The hydrogen system of claim 5, wherein the second heat exchanger is provided with an inlet for the supply of additional water.

7. The hydrogen system of claim 1, further comprising a water shift reactor through which the reformate gas flows and which uses carbon monoxide produced in the reformer to produce hydrogen and carbon dioxide.

8. The hydrogen system of claim 1, wherein the hydrogen consumer comprises a fuel cell with an anode side comprising a fluid inlet and a fluid outlet and a cathode side comprising a fluid inlet and a fluid outlet, the fuel cell using at least some of the produced hydrogen to produce electrical energy.

9. The hydrogen system of claim 8, further comprising a fan which provides air to the fluid inlet of the cathode side of the fuel cell.

10. The hydrogen system of claim 8, further comprising:
a water shift reactor through which the reformate gas flows and which uses carbon monoxide produced in the reformer to produce hydrogen and carbon dioxide; and
a fourth heat exchanger through which the products from the water shift reactor and products from the cathode side of the fuel cell is passed such that the products from the water shift reactor are cooled by the products from the cathode side of the fuel cell before entering the anode side of the fuel cell.

11. The hydrogen system of claim 10, wherein the fourth heat exchanger is further connected to the offgas burner such that the products from the cathode side of the fuel cell are passed on to the off-gas burner.

12. The hydrogen system of claim 10, wherein the fourth heat exchanger is further arranged in fluid communication with the mixture of steam and air flowing to the reformer such that the products from the cathode side of the fuel cell are passed on to the reformer.

13. The hydrogen system of claim 8, wherein that the fuel cell is a HT-PEM fuel cell.

14. The hydrogen system of claim 1, wherein the hydrogen consumer comprises a PEM fuel cell or HT-PEM fuel cell.

15. A method for starting up a hydrogen system which includes
a reformer in which a vaporized hydrocarbon fuel is reformed to yield a reformate gas comprising hydrogen, the reformer including a mixing space and a reforming space, the mixing space comprising a vaporizer for the vaporization of liquid hydrocarbon fuel, water and air inlet or inlets for the supply of steam and air and a glow plug, the reforming space comprising a catalyst for the reforming process and an outlet for the reformate gas,
a hydrogen consumer arranged in fluid communication with the reformer such that the reformate gas is fed to the hydrogen consumer, the hydrogen consumer consuming at least a part of the hydrogen produced by the reformer,
an offgas burner which is arranged in fluid communication with the hydrogen consumer and receives offgas exhausted from the hydrogen consumer, the offgas burner combusting remaining reformate gas in the offgas from the hydrogen consumer,
a first heat exchanger which is in fluid communication with the offgas burner and receives exhaust gas from the offgas burner,
an air pump which is arranged in fluid communication with the reformer and the offgas burner, the air pump supplying air to said reformer and offgas burner, and
a water pump which is arranged in fluid communication with the first heat exchanger and, thereafter, the reformer, the water pump feeding water to the first heat exchanger wherein the heat energy contained in the exhaust gas from the offgas burner is used to produce steam, wherein the steam produced by the first heat exchanger is fed to the reformer,
the method comprising:
passing the liquid hydrocarbon fuel through the vaporizer and mixing a resulting hydrocarbon vapor with air in the mixing space;
turning on the glow plug when the hydrocarbon fuel vaporizer has reached a predetermined temperature and thereby starting a combustion of the mixture of hydrocarbon vapor and air;
continuing said combustion until the reformer catalyst inlet temperature has reached a predefined value;
after the reformer catalyst inlet temperature has reached the predefined value, terminating said combustion by turning off the supply of liquid hydrocarbon fuel and the glow plug;
cooling down the mixing space in which said combustion has taken place until a predetermined temperature has been reached at which self-ignition of the mixture of hydrocarbon vapor and air will not take place;
turning on the glow plug in the offgas burner and the supply of liquid hydrocarbon fuel to the reformer, whereby the reformer starts producing the reformate gas by catalytic partial oxidation;
passing the reformate gas to the offgas burner wherein the reformate gas is burned off to produce heat;
using the heat produced by the offgas burner to preheat the air being fed to the reforming, the preheating taking place in a third heat exchanger;
turning on the water pump when the temperature of the first heat exchanger reaches a predetermined temperature whereby heat energy contained in the exhaust from the offgas burner is used to produce steam;
feeding the reformer with the mixture of steam and air so that a steam reforming process starts; and
after said steam reforming process starts, gradually increasing the amount of steam being fed into the reformer such that the reforming process is gradually converted to auto thermal reforming.

16. The method of claim 15, further comprising providing the hydrogen consumer with a bypass fluid line for the reformate gas and passing the reformate gas through the bypass fluid line.

17. The method of claim 16, further comprising:
providing the bypass fluid line with a heat exchanger and the hydrogen consumer with a heating-cooling circuit; and
exchanging heat between the fluid flowing in the heating-cooling circuit and the reformate gas flowing in the bypass fluid line.

18. The method of claim 15, further comprising providing a second heat exchanger through which reformate gas and the steam from the first heat exchanger, or a mixture of steam from the first heat exchanger and air, can be passed before being fed to the reformer, thereby decreasing the temperature of the reformate gas and increasing the temperature of the steam or the mixture of steam and air.

19. The method of claim 18, further comprising supplying extra water to the second heat exchanger, thereby further lowering the temperature of the reformate gas and increasing the amount of steam that is fed to the reformer.

20. The method of claim 18, further comprising at least partially removing carbon monoxide in the reformate gas using a water shift reactor with an inlet and an outlet, the inlet of water shift reactor being arranged in fluid communication the second heat exchanger and the outlet of the water shift reactor being in fluid communication with the hydrogen consumer.

21. The method of claim 20, further comprising:
providing a fourth heat exchanger in fluid communication with the water shift reactor and the anode side of the fuel cell; and
exchanging heat between the reformate gas and steam from the first heat exchanger before the reformate gas is fed into the anode side of the fuel cell.

22. The method of claim 20, further comprising:
providing a fourth heat exchanger in fluid communication with the water shift reactor and the anode side of the fuel cell; and
using the fourth heat exchanger to exchange heat between the reformate gas and products from the cathode side of the fuel cell before the reformate gas is fed into the anode side of the fuel cell.

23. The method of claim 15, further comprising at least partially removing carbon monoxide in the reformate gas using a water shift reactor with an inlet and an outlet, the inlet of water shift reactor being arranged in fluid communication with the reformer and the outlet of the water shift reactor being in fluid communication with the hydrogen consumer.

24. The method of claim 15, further comprising providing the hydrogen consumer with a fuel cell comprising an anode side and a cathode side.

25. The method of claim 24, further comprising feeding the products from the cathode side of the fuel cell into the offgas burner.

26. The method of claim 15, further comprising supplying air to the offgas burner using a separate air pump.

27. The method of claim 15, further comprising desulphurizing the liquid hydrocarbon fuel using desulphurizing equipment before passing the liquid hydrocarbon fuel through the vaporizer.

28. The method of claim 15, wherein the hydrogen consumer comprises a PEM fuel cell or a HT-PEM fuel cell.

29. The method of claim 15, wherein said turning on the water pump is performed when the temperature of the first heat exchanger reaches 100° C.

* * * * *